United States Patent
Rai (10) Patent No.: US 8,427,670 B2
(45) Date of Patent: Apr. 23, 2013

(54) SYSTEM AND METHOD FOR IMPROVING THROUGHPUT IN A PRINT PRODUCTION ENVIRONMENT

(75) Inventor: Sudhendu Rai, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 1420 days.

(21) Appl. No.: 11/750,762

(22) Filed: May 18, 2007

(65) Prior Publication Data

US 2008/0285067 A1     Nov. 20, 2008

(51) Int. Cl.
*G06F 3/12* (2006.01)
*G06K 15/00* (2006.01)
*H04N 0/60* (2006.01)
*G06F 15/173* (2006.01)

(52) U.S. Cl.
USPC ......... 358/1.15; 358/1.13; 358/1.16; 358/1.9; 709/223; 709/224; 709/225; 709/226

(58) Field of Classification Search .......................... None
See application file for complete search history.

(56) References Cited

U.S. PATENT DOCUMENTS

| | | |
|---|---|---|
| 5,095,369 A | 3/1992 | Ortiz et al. |
| 5,513,126 A | 4/1996 | Harkins et al. |
| 5,559,933 A | 9/1996 | Boswell |
| 6,223,205 B1 | 4/2001 | Harchol-Balter et al. |
| 6,509,974 B1 | 1/2003 | Hansen |
| 6,573,910 B1 | 6/2003 | Duke et al. |
| 6,631,305 B2 | 10/2003 | Newmark |
| 6,633,821 B2 | 10/2003 | Jackson et al. |
| 6,762,851 B1 * | 7/2004 | Lynch et al. ................. 358/1.15 |
| 6,805,502 B2 * | 10/2004 | Rai et al. ........................ 400/61 |
| 6,961,732 B2 | 11/2005 | Hellemann et al. |
| 7,051,328 B2 * | 5/2006 | Rai et al. ....................... 718/102 |
| 7,064,848 B2 * | 6/2006 | Jackson et al. ............... 358/1.13 |

(Continued)

FOREIGN PATENT DOCUMENTS

| | | |
|---|---|---|
| CA | 2503427 A1 | 10/2005 |
| EP | 1630663 A2 | 3/2006 |

(Continued)

OTHER PUBLICATIONS

Harchol-Balter, et al., "On Choosing a Task Assignment Policy for a Distributed Server System," IEEE Journal of Parallel and DistributedComputing, 1999, pp. 204-228.

(Continued)

*Primary Examiner* — Hilina S Kassa
(74) *Attorney, Agent, or Firm* — Fox Rothschild LLP (57) ABSTRACT

Systems and methods for increasing throughput of print jobs in a print shop environment are disclosed. A system may include a plurality of resources, a print job workflow management system that coordinates a flow of print jobs with respect to the plurality of resources, and a processor-readable storage medium in communication with the print job workflow management system. The processor-readable storage medium may contain one or more programming instructions that, when executed, direct the print job workflow management system to receive print job characteristics pertaining to a plurality of print jobs processed in the print shop environment. Data determined based on the received print job characteristics, including a form type utilized in the print shop environment for each job and a print volume associated with each form type, may be provided. The plurality of resources may then be assigned based on the print volume associated with each form type.

16 Claims, 6 Drawing Sheets

U.S. PATENT DOCUMENTS

| | | | |
|---|---|---|---|
| 7,065,567 B1* | 6/2006 | Squires et al. | 709/223 |
| 7,079,266 B1* | 7/2006 | Rai et al. | 358/1.13 |
| 7,092,922 B2 | 8/2006 | Meng et al. | |
| 7,148,985 B2 | 12/2006 | Christodoulou et al. | |
| 7,152,589 B2 | 12/2006 | Ekeroth et al. | |
| 7,161,699 B2 | 1/2007 | Matoba | |
| 7,200,505 B2 | 4/2007 | Shan | |
| 7,379,206 B2* | 5/2008 | Gartstein et al. | 358/1.9 |
| 7,515,295 B2* | 4/2009 | Kremer et al. | 358/1.18 |
| 7,523,048 B1 | 4/2009 | Dvorak | |
| 7,548,335 B2 | 6/2009 | Lawrence et al. | |
| 7,558,638 B2* | 7/2009 | Chang et al. | 700/97 |
| 7,562,062 B2 | 7/2009 | Ladde et al. | |
| 7,576,874 B2 | 8/2009 | Farrell et al. | |
| 7,584,116 B2 | 9/2009 | Kakouros et al. | |
| 7,590,937 B2 | 9/2009 | Jacobus et al. | |
| 7,603,288 B2* | 10/2009 | Chang et al. | 705/22 |
| 7,689,694 B2 | 3/2010 | Kato et al. | |
| 7,755,778 B2* | 7/2010 | Rai et al. | 358/1.1 |
| 7,761,336 B1 | 7/2010 | Blankenship et al. | |
| 7,949,740 B2 | 5/2011 | Scrafford et al. | |
| 7,999,956 B2* | 8/2011 | Rai | 358/1.15 |
| 8,107,106 B2* | 1/2012 | Rai | 358/1.15 |
| 2002/0054344 A1 | 5/2002 | Tateyama | |
| 2002/0071134 A1 | 6/2002 | Jackson et al. | |
| 2002/0129081 A1* | 9/2002 | Rai et al. | 709/102 |
| 2002/0198794 A1 | 12/2002 | Williams et al. | |
| 2003/0079160 A1 | 4/2003 | McGee et al. | |
| 2003/0105661 A1 | 6/2003 | Matsuzaki et al. | |
| 2003/0121431 A1 | 7/2003 | Ohno | |
| 2003/0200252 A1 | 10/2003 | Krum | |
| 2003/0202204 A1 | 10/2003 | Terrill et al. | |
| 2004/0006522 A1* | 1/2004 | Keane et al. | 705/35 |
| 2004/0135838 A1 | 7/2004 | Owen et al. | |
| 2004/0136025 A1 | 7/2004 | Moriyama et al. | |
| 2004/0239992 A1 | 12/2004 | Kawai et al. | |
| 2004/0268349 A1 | 12/2004 | Ramakrishnan et al. | |
| 2005/0065830 A1* | 3/2005 | Duke et al. | 705/7 |
| 2005/0068562 A1 | 3/2005 | Ferlitsch | |
| 2005/0096770 A1 | 5/2005 | Chua et al. | |
| 2005/0114829 A1 | 5/2005 | Robin et al. | |
| 2005/0151993 A1* | 7/2005 | Gartstein et al. | 358/1.15 |
| 2005/0154625 A1 | 7/2005 | Chua et al. | |
| 2005/0275875 A1 | 12/2005 | Jennings | |
| 2006/0031585 A1 | 2/2006 | Nielsen et al. | |
| 2006/0149755 A1 | 7/2006 | Marshall et al. | |
| 2006/0178917 A1* | 8/2006 | Merriam et al. | 705/7 |
| 2006/0224440 A1 | 10/2006 | Rai | |
| 2006/0226980 A1 | 10/2006 | Rai et al. | |
| 2006/0271927 A1* | 11/2006 | Morales et al. | 717/171 |
| 2007/0008580 A1 | 1/2007 | Tanaka | |
| 2007/0046987 A1 | 3/2007 | Shima | |
| 2007/0070379 A1 | 3/2007 | Rai et al. | |
| 2007/0078585 A1 | 4/2007 | Pomeroy et al. | |
| 2007/0091355 A1 | 4/2007 | Rai | |
| 2007/0092323 A1 | 4/2007 | Lin et al. | |
| 2007/0124182 A1 | 5/2007 | Rai | |
| 2007/0177191 A1 | 8/2007 | Eschbach et al. | |
| 2007/0236724 A1 | 10/2007 | Rai et al. | |
| 2007/0247657 A1 | 10/2007 | Zhang et al. | |
| 2007/0247659 A1 | 10/2007 | Zhang et al. | |
| 2007/0279675 A1 | 12/2007 | Quach et al. | |
| 2007/0293981 A1 | 12/2007 | Rai | |
| 2008/0013109 A1 | 1/2008 | Chen et al. | |
| 2008/0201182 A1 | 8/2008 | Schneider et al. | |
| 2008/0239366 A1 | 10/2008 | Cyman et al. | |
| 2008/0239368 A1 | 10/2008 | Ota | |
| 2008/0256541 A1 | 10/2008 | Rai | |
| 2009/0094094 A1 | 4/2009 | Rai et al. | |
| 2009/0313061 A1 | 12/2009 | Rai et al. | |
| 2009/0313063 A1 | 12/2009 | Rai | |
| 2009/0327033 A1 | 12/2009 | Rai et al. | |

FOREIGN PATENT DOCUMENTS

| | | |
|---|---|---|
| EP | 1705556 A1 | 9/2006 |
| JP | 2001203842 A | 7/2001 |
| JP | 2005011066 A | 1/2005 |
| JP | 2005250823 A | 9/2005 |
| JP | 2007272899 A | 10/2007 |

OTHER PUBLICATIONS

Dueck, et al., "Threshold Accepting: A General Purpose Optimization Algorithm Appearing Superior to Simulated Annealing", Journal of Computational Physics vol. 90, Issue 1, Sep. 1990, pp. 161-175, Academic Press, Inc.

Rai, et al., "A Lean Document Production Controller for Printshop Management", Proceedings of the 42.sup.nd IEEE Conference on Decision and Control, Maui, Hawaii, Dec. 2003.

Zheng et al., "Finding Optimal (s,S) Policies Is About as Simple as Evaluating a Single Policy", Operations Research, vol. 39, No. 4, (Jul.-Aug. 1991), pp. 654-665.

Bo Hu, "An Application of Inventory Models in Printing Industry", Ph.D. Candidate in Operations Management, The Simon School of Business, University of Rochester, Jul. 2007.

Veinott, Jr., et al.; "Computing Optimal (s,S) Inventory Policies", Management Science, vol. 11, No. 5, Series A., Sciences, Mar. 1965, pp. 525-552.

Simchi Levi, et al. "Designing & Managing The Supply Chain: Concepts, Strategies and Cases", Second Edition, 2000, McGraw Hill Higher Education, New York, New York.

Cleveland et al., "STL: A Seasonal-Trend Decomposition Procedure Based on Loess", Journal of Official Statistics, vol. 16, No. 1, 1990, pp. 3-33, Sweden.

Veinott, Jr., "Optimal Policy in a Dynamic, Single Product, Nonstationary Inventory Model with Several Demand Classes", Mar. 16, 1965, Operations Research, vol. 13, No. 5, Sep.-Oct. 1965, pp. 761-778.

Faraway, "Extending the Linear Model with R: Generalized Linear, Mixed Effects and Nonparametric Regression Models", 2006, Chapman & Hall/CRC, Boca Raton, Florida.

\* cited by examiner

SYSTEM AND METHOD FOR IMPROVING THROUGHPUT IN A PRINT PRODUCTION ENVIRONMENT

BACKGROUND

1. Technical Field

The present disclosure generally relates to printing systems and methods, and especially methods and systems for improving throughput in a print production environment. More particularly, the present disclosure relates to systems and methods for collecting job characteristics from a print production environment and providing optimization information based on the collected job characteristics.

2. Background

A transaction printing environment is typically a high-volume document production entity that produces documents associated with financial transactions such as checks, invoices, statements and the like from a data stream for businesses. Typically, the data printed on each document (or set of documents) varies significantly. For example, the data on a first document might pertain to a first credit card user for a credit institution, while the data on a second document might pertain to a second credit card user for the credit institution. This is in contrast to a printing environment, such as book printing, where several identical documents may be produced and finished consecutively.

Figure 1:
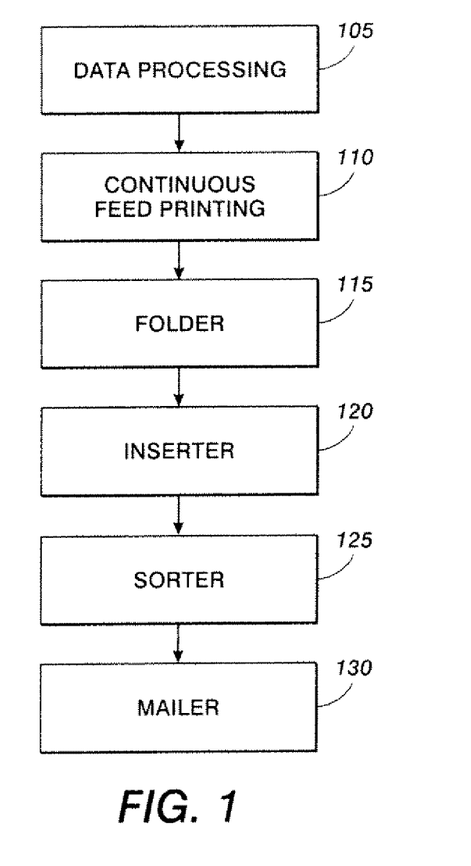
FIG. 1 depicts a transaction print workflow according to the known art.

A conventional transaction print workflow is depicted in FIG. 1. As shown in FIG. 1, incoming data pertaining to a job is processed 105 to determine the operations to be performed. The data is then printed 110 using, for example a continuous feed printer. A continuous feed printer may include a roll of paper including pre-printed forms. As such, paper is continuously fed into the printer resulting in high speed printing. In a typical transaction print operation, data is printed on the forms corresponding to a plurality of recipients.

One or more of folding 115, inserting 120 and sorting 125 operations can be performed based on the requirements of the transaction print job. For a folding operation 115, each printed form can be folded according to the transaction print job requirements. Ancillary documents can be inserted 120 into the print job. For example, an advertisement for a service provided by a bank might be inserted into a bank statement print job. A sorting operation 125 could be used to sort the documents into individual document groups for each recipient. Each document group can then be mailed 130 to the appropriate recipient.

Methods exist for improving the operation of the traditional print shop. One method involves re-conceptualizing a traditional print shop as a type of factory process. The print shop is considered to be synonymous with a factory plant, and each print job is considered to be synonymous with a manufactured product. In this manner, commonly known factory flow processes can be adapted to the print shop environment and used to improve the flow of print jobs through the print shop.

In accordance with another method, a print shop may be reorganized into autonomous cells as disclosed in U.S. Pat. No. 7,079,266 to Ria et al., the disclosure of which is incorporated herein in its entirety. An autonomous cell is a group of resources used to process jobs of at least one type. A resource may include a device configured to process at least a portion of one or more jobs. In a document production or print shop environment, a resource may include a printer, a copier, a binder, a hole-punch, a collator, a sealer, an inserter or any other equipment used to process print jobs. Autonomous cells group equipment together according to different job types commonly encountered within a specific print shop. In one example of operation a job may be broken down into smaller sub-jobs and processed through the autonomous cells. Another method to improve operation is to cross-train operators on multiple pieces of equipment. Operators can then be allocated more flexibly as needed throughout the shop. Opportunities also exist to improve scheduling of jobs so as to reduce the amount of inventory and to more fully utilize equipment. An additional option is to improve the layout of equipment on the print shop floor in order to decrease the amount of excess movement required within the print shop. These methods have been shown to reduce the cost of operating all classes of print shops by up to twenty percent within six months of initial implementation.

Although such methods for operational improvement exist, print shop owners are understandably slow to change their methods of operations. Resistance to change can occur because such change can be quite invasive. For example, implementing operational improvements may require retraining operators, moving heavy equipment, and learning new processes all of which equate to down time and lost productivity for the shop during transition. This lost productivity is problematic for a shop owner who must keep the shop operating smoothly throughout the transition period. As such, a print shop owner has little incentive to make operational changes without having quantitative data showing a positive benefit to bottom-line profits. It is therefore problematic that print shop owners typically have insufficient data to quantify the extent of possible gains available to them by implementing improved operational methods.

Accordingly, systems and methods for providing print shop owners with sufficient data to quantify the extent of possible available gains would be desirable.

SUMMARY

Before the present methods are described, it is to be understood that this invention is not limited to the particular systems, methodologies or protocols described, as these may vary. It is also to be understood that the terminology used herein is for the purpose of describing particular embodiments only, and is not intended to limit the scope of the present disclosure which will be limited only by the appended claims.

It must be noted that as used herein and in the appended claims, the singular forms "a," "an," and "the" include plural reference unless the context clearly dictates otherwise. Thus, for example, reference to a "job" is a reference to one or more jobs and equivalents thereof known to those skilled in the art, and so forth. Unless defined otherwise, all technical and scientific terms used herein have the same meanings as commonly understood by one of ordinary skill in the art. As used herein, the term "comprising" means "including, but not limited to."

In an embodiment, a system for increasing throughput of print jobs in a print shop environment may include a plurality of resources a print job workflow management system that coordinates a flow of print jobs with respect to the plurality of resources, and a processor-readable storage medium in communication with the print job workflow management system. The processor-readable storage medium may contain one or more programming instructions for performing a method of increasing throughput in a print shop environment. The one or more programming instructions may include receiving, by the print job workflow management system, print job characteristics pertaining to a plurality of print jobs processed in the print shop environment pro id data, including a form type utilized in the print shop environment for each job, and a print volume associated with each form type determined based on the received print job characteristics, and assigning the plurality of resources based on the print volume associated with each form type.

In an embodiment, system for increasing throughput of print jobs in a print shop environment may include a plurality of resources, a print job workflow management system that coordinates a flow of print jobs with respect to the plurality of resources, and a processor-readable storage medium in communication with the print job workflow management system. The processor-readable storage medium may contain one or more programming instructions for performing a method of increasing throughput in a print shop environment. The one or more programming instructions may include receiving, by the print job workflow management system job characteristics pertaining to a plurality of print jobs processed in the print shop environment, providing data pertaining to ratios of print time to insert time for the plurality of print jobs determined based on the received job characteristics, determining whether a bottleneck exists in the print shop environment based on the data, and, if so, assigning one or more of the plurality of resources based on the bottleneck.

In an embodiment, a method of increasing throughput in a job production environment including one or more autonomous cells with each of the one or more autonomous cells including at least one resource and being capable of completely processing a job or sub-job type may include receiving, by a job production workflow management system, job characteristics pertaining to a plurality of jobs processed in the job production environment, developing a set of data based on the received job characteristics, and using the set of data to assign, by the job production workflow management system, a resource to one of the one or more autonomous cells.

In an embodiment, a method of increasing throughput in a job production environment including one or more autonomous cells with each of the one or more autonomous cells including at least one resource and being capable of completely processing a job or sub-job type may include receiving, by a job production workflow management system, job characteristics pertaining to a plurality of jobs processed in the job production environment, determining a data value based on the received job characteristics, determining whether a bottleneck exists in the job production environment based on the data value, and if so, using the data value to assign, by the job production workflow management system, a resource in the job production environment based on the bottleneck.

BRIEF DESCRIPTION OF THE DRAWINGS

Aspects features, benefits and advantages of the present invention will be apparent with regard to the following description and accompanying drawings, of which.

DETAILED DESCRIPTION

For purposes of the discussion below, a "print shop" refers to an entity that includes a plurality of document production resources, such as printers, cutters, collators, inserters and the like. The print shop may be a freestanding entity, including one or more print or related devices, or it may be part of a corporation or other entity. Additionally, the print shop may communicate with one or more servers by way of a local area network (LAN) or a wide area network (WAN), such as the Internet, the World Wide Web or the like.

The term "device" refers to a machine used to perform an operation. Exemplary devices include computers, print engines and other document processing devices, such as printers, scanners, facsimile devices and/or the like. A device contains information representing a device state and/or one, or more software programs that are each used to perform one or more operations.

A "job" refers to a logical unit of work that is to be completed for a customer. In a transaction printing environment, a job may include one or more print jobs from one or more clients. A production system may include a plurality of jobs.

A "print job" refers to a job processed in a document production system. For example, a print job may include producing credit card statements corresponding to a certain credit card company, producing bank statements corresponding to a certain bank, printing a document or the like.

Figure 2:
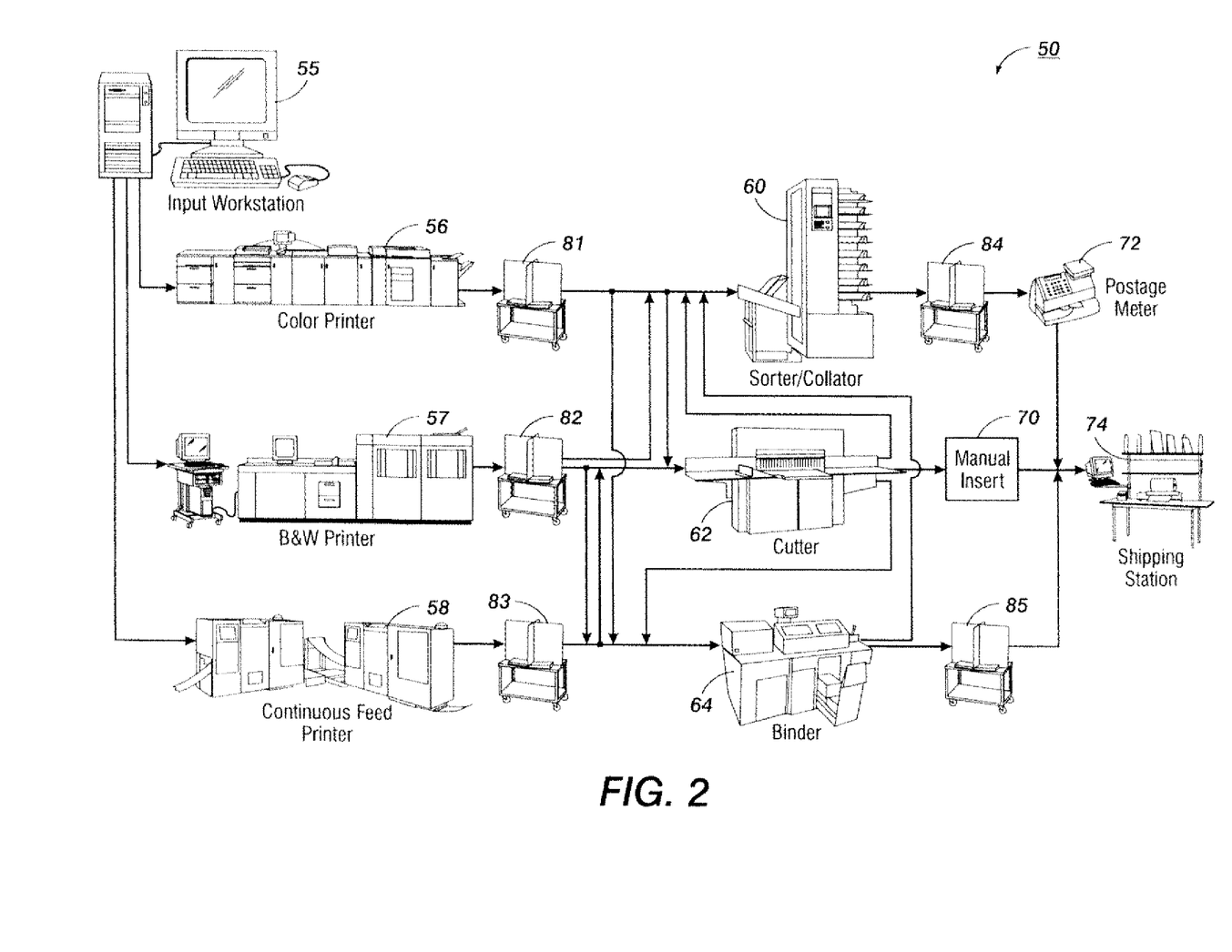
FIG. 2 depicts a block diagram for exemplary print shop elements.

FIG. 2 shows an example of a production environment 50, in this case, exemplary elements of a print shop. Print jobs may enter the print shop manually or electronically and be collected at an electronic submission system 55 such as a computing device and/or scanner. Jobs are sorted and batched at the submission system or another location before being delivered to one or more print engines such as a color printer 56, black-and-white printer 57 and/or a continuous feed printer 58. Jobs may exit the print engine and be delivered to one or more finishing devices or areas such as a collator 60, cutter 62, and/or binder 64. The finishing areas may include automatic or manual areas for such finishing activities and they also may include an automatic or manual inserter 70. Finally, jobs may move to a postage metering station 72 and/or shipping station 74. Jobs may move from one location to another in the print shop by automatic delivery or manual delivery such as by hand or by one or more paper carts 81-85.

Different elements of a production environment may require setup time in order to prepare the device to process a particular job. For example, some print jobs use pre-printed forms, such as bank statements, pre-printed with the bank's logo and contact instructions or credit card statements pre-printed with charge dispute procedures. Forms also may include inserts such as marketing materials or subscription cards. If a device in a print shop environment receives two consecutive jobs that use identical forms, then little or no changeover is required between the two jobs. However, if the forms are different, then the jobs have different setup characteristics, and a significant setup time may be required to load the new form into the machine. This is especially noticeable in continuous feed printing devices 58, where it can take up to 15 minutes or more to load a new form roll.

Figure 3A:
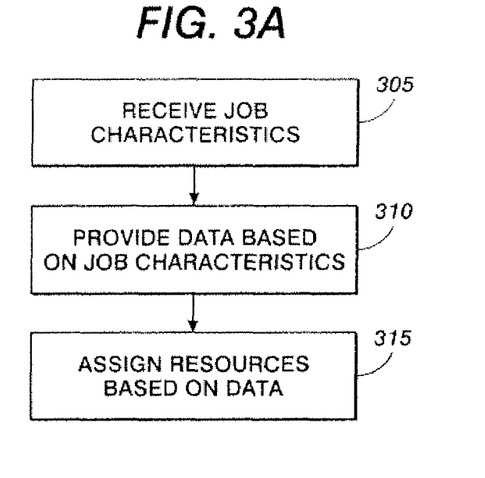
FIGS. 3A and 3B depict flow diagrams of exemplary methods for utilizing job characteristics in a production environment according to an embodiment.

FIG. 3A depicts a flow diagram of an exemplary method for utilizing job characteristics in a production environment according to an embodiment. Simulating the operation of production environments and/or retrieving statistical information from the operation operation of production environments may enable such environments to be optimized. A work flow management system may receive 305 information pertaining to a plurality of jobs processed by a production environment, such as a print shop. In an embodiment, the information may be received as a data stream from the customer and stored in a database that is subsequently processed by a software program to create printable documents. In an embodiment, a customer may provide a print shop with document files (e.g., PDF or postscript files) that can be directly routed for printing.

Exemplary information received by the workflow management system may include a plurality of job characteristics for each job. Exemplary job characteristics for a print shop environment may include, without limitation, a job identifier, a job arrival time, a job due time, a form type, a form count, a form width, a form length, an envelope count, a print class, an insert process type, an insert group type, an insert time, a print time, an insert setup time and/or a print setup time. Additional and or alternate job characteristics or other information may also be received by a workflow management system.

A job identifier may include an alphanumeric value that uniquely identifies a job. A job arrival time is a date and/or time at which a job arrives at the production environment. A job due time is a date and/or time that a job is due for delivery from the production environment.

A form type is an identifier that uniquely identifies a type of form on which a document is printed for a job. A form count is a number of forms required to process a job. A form width is a width of a form on which a document is printed for a job. A form length is a length of a form on which a document is printed for a job. In an embodiment, the form width and form length characteristics may not be explicitly provided, but may be inherent based on, for example, the form type.

An envelope count is a number of envelopes to be produced for a job that includes items to be mailed. A print class is a type of printing that is performed for a job. Exemplary print classes may include, without limitation, simplex printing (one-sided printing), duplex printing (two-sided printing), mier-simplex printing and mier-duplex printing.

An insert process type is an identifier that uniquely identifies whether a job includes machine insertion or hand insertion. An insert group type is an alphanumeric identifier that identifies a set of inserts for the job. An insert time is the total time required to perform insertion operations for a job. An insert setup time is the total time required to setup an inserter that performs document insertion operations for a job.

A print time is the total time required to perform printing operations for a job. A print setup time is the total time required to setup a printer that performed printing operations for a job.

An exemplary set of job characteristics is shown in Table 1.

TABLE 1

| Job ID | Arrival | Due | Form Type | Form Count | Form Width | Form Length | Total Count | Class | Insert Process Type | Insert Group Type | Insert Time | Print Time |
|---|---|---|---|---|---|---|---|---|---|---|---|---|
| 1 | 3/1/07 12:00 AM | 3/3/07 4:00 PM | 1 | 1623 | 15 | 11 | 1612 | Duplex | 1 | 15 | 1.06 | 0.4058 |
| 2 | 3/1/07 12:00 AM | 3/3/07 4:00 PM | 2 | 52 | 15 | 14 | 52 | Duplex | 0 | 7 | 0.87 | 0.0130 |
| 3 | 3/1/07 12:00 AM | 3/2/07 4:00 PM | 2 | 11 | 15 | 14 | 11 | Duplex | 0 | 7 | 0.18 | 0.0028 |
| 4 | 3/1/07 12:00 AM | 3/2/07 4:00 PM | 3 | 63 | 15 | 11 | 33 | Micr Duplex | 0 | 4 | 0.55 | 0.0158 |
| 5 | 3/1/07 12:00 AM | 3/2/07 4:00 PM | 4 | 1 | 15 | 14 | 1 | Duplex | 0 | 8 | 0.02 | 0.0003 |
| 6 | 3/1/07 12:00 AM | 3/2/07 4:00 PM | 4 | 41 | 15 | 14 | 41 | Duplex | 0 | 44 | 0.68 | 0.0103 |
| 7 | 3/1/07 12:00 AM | 3/3/07 4:00 PM | 5 | 5 | 18 | 11 | 5 | Duplex | 0 | 3 | 0.08 | 0.0013 |
| 8 | 3/1/07 12:00 AM | 3/1/07 4:00 PM | 6 | 32 | 18 | 14 | 28 | Duplex | 0 | 14 | 0.47 | 0.0080 |
| 9 | 3/1/07 12:00 AM | 3/3/07 4:00 PM | 7 | 2640 | 15 | 14 | 2533 | Duplex | 1 | 1 | 1.60 | 0.6600 |
| 10 | 3/1/07 12:00 AM | 3/1/07 4:00 PM | 8 | 4 | 15 | 11 | 4 | Duplex | 0 | 632 | 0.07 | 0.0010 |
| 11 | 3/1/07 12:00 AM | 3/1/07 4:00 PM | 9 | 28310 | 18 | 11 | 18990 | Duplex | 1 | 77 | 7.23 | 7.0775 |
| 12 | 3/1/07 12:00 AM | 3/2/07 4:00 PM | 9 | 217 | 18 | 11 | 118 | Duplex | 1 | 84 | 0.09 | 0.0543 |
| 13 | 3/1/07 12:00 AM | 3/4/07 4:00 PM | 9 | 193 | 18 | 11 | 151 | Duplex | 1 | 77 | 0.68 | 0.0483 |
| 14 | 3/1/07 12:00 AM | 3/4/07 4:00 PM | 9 | 82 | 18 | 11 | 82 | Duplex | 1 | 77 | 0.49 | 0.0205 |
| 15 | 3/1/07 12:00 AM | 3/3/07 4:00 PM | 9 | 40 | 18 | 11 | 17 | Duplex | 0 | 83 | 0.28 | 0.0100 |
| 16 | 3/1/07 12:00 AM | 3/3/07 4:00 PM | 9 | 35 | 18 | 11 | 7 | Duplex | 0 | 83 | 0.12 | 0.0088 |
| 17 | 3/1/07 12:00 AM | 3/4/07 4:00 PM | 9 | 56 | 18 | 11 | 7 | Duplex | 0 | 83 | 0.12 | 0.0140 |
| 18 | 3/1/07 12:00 AM | 3/4/07 4:00 PM | 9 | 18 | 18 | 11 | 6 | Duplex | 0 | 83 | 0.10 | 0.0045 |
| 19 | 3/1/07 12:00 AM | 3/3/07 4:00 PM | 9 | 3 | 18 | 11 | 1 | Duplex | 0 | 84 | 0.02 | 0.0008 |

Figure 4:
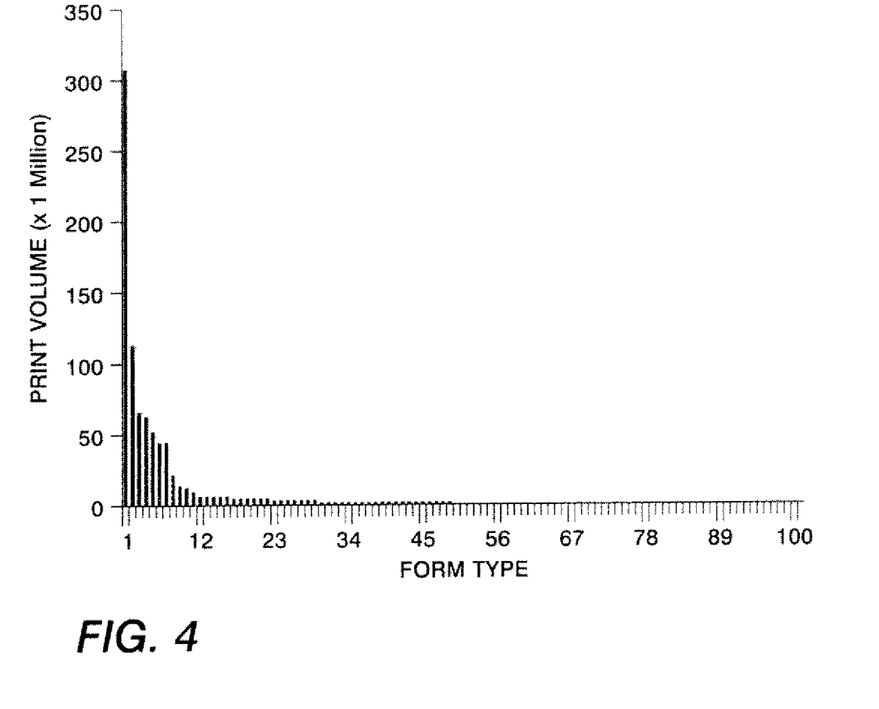
FIG. 4 depicts a graph of exemplary print volume for form types in a production environment according to an embodiment.

The workflow management system may provide 310 output data based on the received job characteristics. The output data may pertain to, for example and without limitation, a form type utilized for each job in the production environment and a print volume associated with each form type. For example, the form type and form count for each job may be used to determine the print volume for each form type. Form types having high print volumes may be considered to be of greater importance for increasing throughput in the production environment because more forms of such form types are processed by the production environment. As such, high-volume form types may be used by a warehouse management system to determine inventory storage replenishment policies for a print shop warehouse. For example, if a form type is heavily utilized, the warehouse management system may direct storage of forms of the form type at a storage location in the print shop warehouse that is readily accessible for transportation to the print shop floor and/or at a storage location on the floor itself. Delivery of a form having a particular form type to an autonomous cell may be scheduled based on the print volume for the form type and/or the frequency at which the form type is utilized. Likewise, inventory re-order quantity for each form type may be governed by the print volume for the form type and/or the frequency at which the form type is utilized. Exemplary output data is shown in FIG. 4.

Referring back to FIG. 3A resources in the production environment may be assigned 315 based on the data. In an embodiment, the resources may be assigned 315 to one or more autonomous cells. The autonomous cells may be organized based on, for example, the print volume of jobs received or expected to be received by the production environment. For example, fast autonomous cells may be assigned 315 to process jobs having form types that have high print volumes. Likewise, slow autonomous cells may be assigned 315 to process jobs having form types that have low print volumes. In a production environment including continuous feed printers, form rolls for form types having a high print volume may be stored in close proximity to an autonomous cell assigned 315 to handle jobs having such form types. Alternate resource assignments may also be performed within the scope of this disclosure.

Figure 3B:
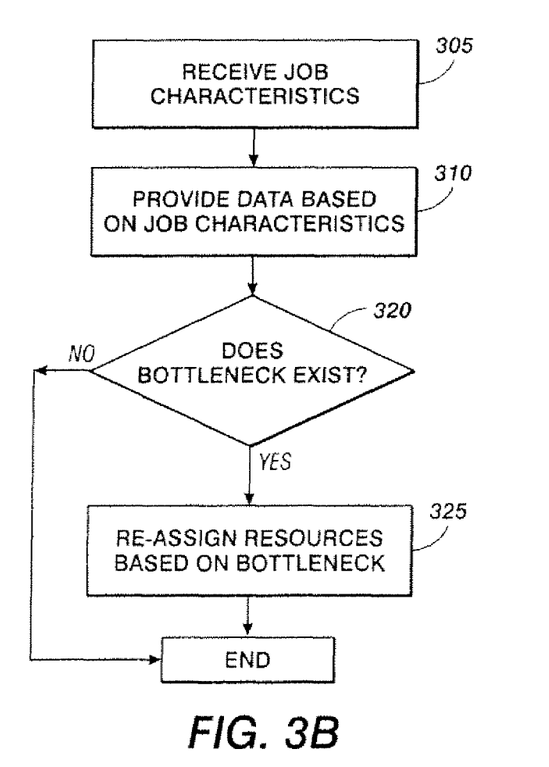

FIG. 3B depicts a flow diagram of an alternate exemplary method for utilizing job characteristics in a production environment according to an embodiment. A workflow management system may receive 305 information pertaining to a plurality of jobs processed by production environments, such as print shops. Exemplary information may include one or more of the job characteristics described above in reference to FIG. 3A.

Figure 5:
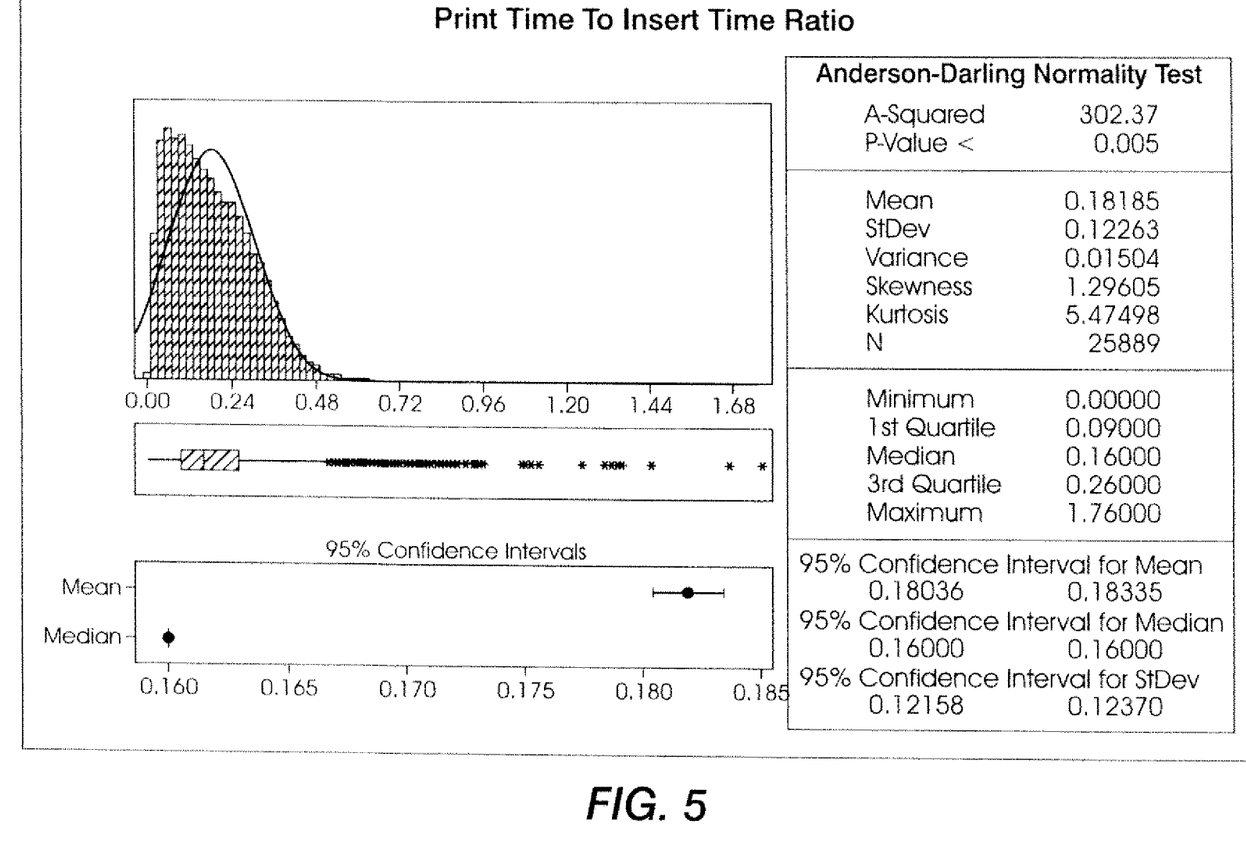
FIG. 5 depicts an exemplary display for data pertaining to a ratio of print time to insert time for jobs in a production environment according to an embodiment.

The workflow management system may determine 310 data based on the received job characteristics. In an embodiment, the data may pertain to, for each job, a ratio of the print time for the job over an insert time for the job. For example the data may pertain to a mean, a median, a standard deviation and/or a coefficient of variation of the ratios. FIG. 5 depicts an exemplary display for data pertaining to a ratio of print time to insert time for jobs in a production environment according to an embodiment. Alternate and/or additional data may be determined based on the received job characteristics.

Referring back to FIG. 3B, the workflow management system may determine 320 whether a bottleneck is present in the production environment based on the data. For example, if the mean ratio is greater than a first threshold, a bottleneck may result from a lack of printers and/or a lack of high-speed printers. In an embodiment, the first threshold may be approximately 1. Conversely, if the mean ratio is less than a second threshold, a bottleneck may result from a lack of inserters and/or a lack of high speed inserters. In an embodiment, the second threshold may be approximately 1.

The bottleneck may be examined locally in time (e.g., all jobs processed in a day). If a bottleneck is determined, the workflow may be dynamically modified and one or more resources may be assigned and/or reassigned 325 in the production environment. For example, if the bottleneck results from a lack of printers and/or a lack of high speed printers, additional printers and/or high-speed printers may be added to the current workflow. A similar analysis can be performed over a longer time period and, if the bottleneck is found to be consistently found to be the printer, one or more current printers may be replaced with higher speed ones. Likewise, if the bottleneck results from a lack of inserters and/or a lack of high speed inserters, additional inserters and or high-speed inserters may be added to the current inserters and/or used to replace one or more current inserters. Alternate and/or additional devices may be assigned, reassigned, added and/or replaced based on the determination of a bottleneck.

A system for increasing throughput in a production environment may include a plurality of resources, and a workflow management system. The resources may include, for example and without limitation, one or more print engine, one or more finishing devices, such as a collator, a cutter and/or a binder, an inserter, a postage metering device, a shipping device and the like. The workflow management system may include a processor and a processor-readable storage medium in communication with the processor that contains one or more programming instructions for performing a method of increasing throughput in a production environment, such as the methods described above.

Figure 6:
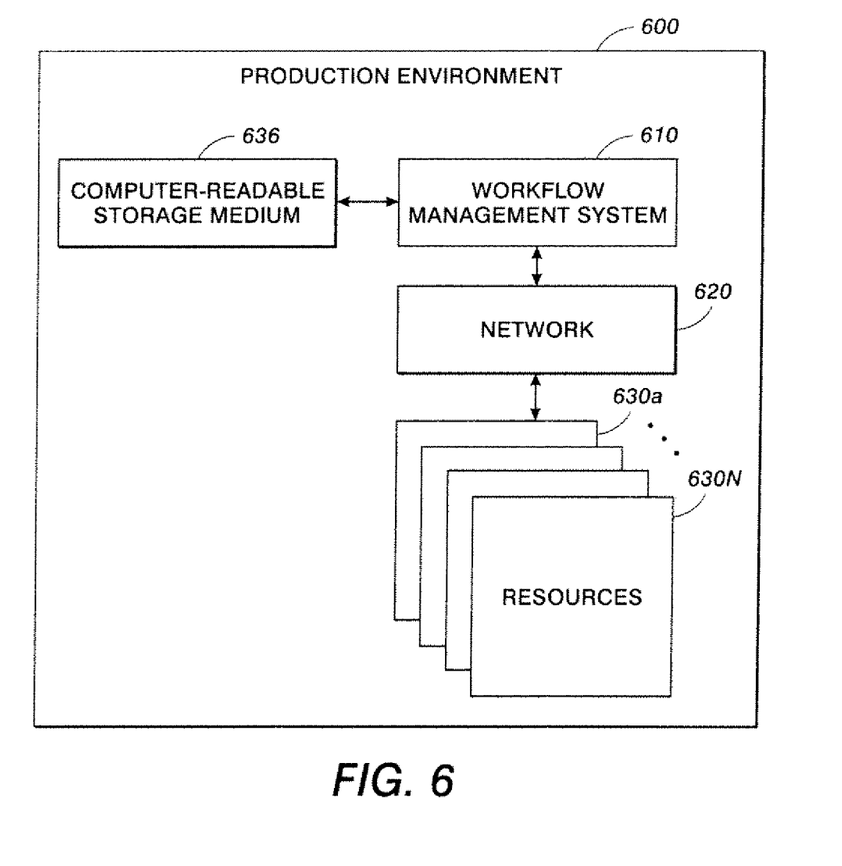
FIG. 6 depicts an environment suitable for practicing the illustrative

FIG. 6 depicts an environment suitable for practicing the illustrative embodiments. The production environment 600 may include a work low management system 610 that is responsible for managing workflow in the production environment and a processor-readable storage medium 635. The processor-readable storage medium may be integral to or separate from the workflow management system 610. The production environment 600 may also include resources 630a-N, such as a printer, a copier, a binder, a hole-punch, a collator, a sealer, an inserter and/or any other equipment used to process jobs. The workflow management system 610 may be implemented on a stand-alone computer system or may be integrated into one or more resource 630a-N. The workflow management system 610 may also be implemented using distributed components such as separate electronic devices. A network 620 may interconnect the resources 630a-N with the workflow management system 610, as illustrated in FIG. 6. The network 620 may include a LAN or a WAN, such as the Internet, the World Wide Web or the like. The network 620 may also be formed by communication links that interconnect the workflow management system 610 and the resources 630a-N. In an embodiment, the network 620 may include a wireless network. Alternatively, the disclosed embodiments may be practiced where no network connection is present.

It will be appreciated that various of the above-disclosed and other features and functions, or alternatives thereof may be desirably combined into many other different systems or applications. It will also be appreciated that various presently unforeseen or unanticipated alternatives, modifications, variations or improvements therein may be subsequently made by the art which are also intended to be encompassed by the disclosed embodiments.

What is claimed is:

1. A method of increasing throughput in a print shop environment, including one or more autonomous cells with each of the one or more autonomous cells including at least one resource and being capable of completely processing a job or sub-job type, the method comprising:

receiving, by a job production workflow management system, job characteristics pertaining to a plurality of jobs to be processed in the print shop environment;

developing a set of data based on the received job characteristics, wherein the developing comprises developing data pertaining to a form type utilized in the print shop environment for each job and a print volume associated with each form type;

using the set of data to assign, by the job production workflow management system, a resource to one of the one or more autonomous cells;

providing, by the job production workflow management system, the data pertaining to the form type utilized in the print shop environment for each job and the print volume associated with each form type to a warehouse management system;

determining, by the warehouse management system, a storage location for pre-printed forms of at least one form type based on the print volume associated with the form type, wherein the storage location is in one or more of the following:
a print shop warehouse, and
a print shop;

receiving, by the job production workflow management system, an insert time and a print time associated with one or more of the plurality of jobs to be processed in the print shop environment;

for one or more jobs from the plurality of jobs, determining a ratio of the print time associated with the print job to the insert time associated with the print job;

determining whether a bottleneck is present in the print shop environment based on the ratios associated with the one or more jobs, wherein determining whether a bottleneck is present comprises determining that a bottleneck is present if a mean value of the ratios is greater than a first threshold value; and in response to determining that a bottleneck exists, dynamically modifying, by the job production workflow management system, a workflow associated with the print shop environment.

2. The method of claim 1 wherein receiving job characteristics comprises receiving, for each job: a job identifier, a form type, a form count, an insert group type, an insert time, a print time, an insert setup time, and a print setup time.

3. The method of claim 1 wherein using the set of data to assign a resource comprises using the set of data to assign a resource based on the print volume associated with each form type.

4. The method of claim 1, wherein:
developing data pertaining to a print volume associated with each form type comprises, for each form type, determining whether the form type is a high print volume form type;
determining a storage location comprises determining, for each form type that is determined to be a high volume form type, a storage location in one or more of the print shop warehouse and the print shop environment for pre-printed forms of the form type that is readily accessible.

5. The method of claim 1, wherein using the set of data to assign a resource to one of the one or more autonomous cells comprises:
determining whether the form type is a high print volume form type, in response to determining that the form type is a high print volume form type, assigning a resource to the one or more autonomous cells, wherein the resource is configured to process jobs having high print volume form types.

6. The method of claim 1, wherein using the set of data to assign a resource to one of the one or more autonomous cells comprises:
determining whether the form type is a low print volume form type,
in response to determining that the form type is a low print volume form type, assigning a resource to the one or more autonomous cells, wherein the resource is configured to process jobs having low print volume form types.

7. A method of increasing throughput in a print shop environment, including one or more autonomous cells with each of the one or more autonomous cells including at least one resource and being capable of completely processing a job or sub-job type, the method comprising:

receiving, by a job production workflow management system, job characteristics pertaining to a plurality of jobs to be processed in the print shop environment;

developing a set of data based on the received job characteristics, wherein the developing comprises developing data pertaining to a form type utilized in the print shop environment for each job and a print volume associated with each form type;

using the set of data to assign, by the job production workflow management system, a resource to one of the one or more autonomous cells;

providing, by the job production workflow management system, the data pertaining to the form type utilized in the production environment for each job and the print volume associated with each form type to a warehouse management system;

scheduling, by the warehouse management system, a delivery of a pre-printed form having a form type utilized in the production environment for at least one job from a print shop warehouse to an autonomous cell based on the print volume associated with the form type;

receiving, by the job production workflow management system, an insert time and a print time associated with one or more of the plurality of jobs to be processed in the print shop environment;

for one or more jobs from the plurality of jobs, determining a ratio of the print time associated with the print job to the insert time associated with the print job;

determining whether a bottleneck is present in the print shop environment based on the ratios associated with the one or more jobs, wherein determining whether a bottleneck is present comprises determining that a bottleneck is present if a mean value of the ratios is greater than a first threshold value; and in response to determining that a bottleneck exists, dynamically modifying, by the job production workflow management system, a workflow associated with the print shop environment.

8. The method of claim 7 wherein receiving job characteristics comprises receiving, for each job: a job identifier, a form type, a form count, an insert group type, an insert time, a print time, an insert setup time, and a print setup time.

9. The method of claim 7 wherein using the set of data to assign a resource comprises using the set of data to assign a resource based on the print volume associated with each form type.

10. The method of claim 7, wherein:
developing data pertaining to a print volume associated with each form type comprises, for each form type, determining whether the form type is a high print volume form type;
scheduling a delivery of a pre-printed form having a form type to an autonomous cell based on the print volume associated with the form type comprises, in response to determining that the form type is a high print volume form type, scheduling a delivery of a pre-printed form having the form type at a greater frequency than delivery of a pre-printed form that is a low print volume form type.

11. The method of claim 7, wherein using the set of data to assign a resource to one of the one or more autonomous cells comprises:
determining whether the form type is a high print volume form type,
in response to determining that the form type is a high print volume form type, assigning a resource to the one or more autonomous cells, wherein the resource is configured to process jobs having high print volume form types.

12. The method of claim 7, wherein using the set of data to assign a resource to one of the one or more autonomous cells comprises:
determining whether the form type is a low print volume form type,
in response to determining that the form type is a low print volume form type, assigning a resource to the one or more autonomous cells, wherein the resource is configured to process jobs having low print volume form types.

13. A method of increasing throughput in a print shop environment, including one or more autonomous cells with each of the one or more autonomous cells including at least one resource and being capable of completely processing a job or sub-job type, the method comprising:
receiving, by a job production workflow management system, an insert time and a print time associated with one or more of a plurality of jobs to be processed in the print shop environment;
for one or more jobs from the plurality of jobs, determining a ratio of the print time associated with the print job to the insert time associated with the print job,
determining whether a bottleneck is present in the print shop environment based on the ratios associated with the one or more jobs, wherein determining whether a bottleneck is present comprises determining that a bottleneck is present if a mean value of the ratios is greater than a first threshold value, and
in response to determining that a bottleneck exists, dynamically modifying, by the job production workflow management system, a workflow associated with the print shop environment.

14. The method of claim 13, wherein dynamically modifying a workflow comprises adding one or more printers to the workflow in response to determining that the mean value of the ratios is greater than the first threshold value.

15. The method of claim 13, wherein determining whether a bottleneck is present in the print shop further comprises determining that a bottleneck is present if the mean value of the ratios is less than a second threshold value.

16. The method of claim 15, wherein dynamically modifying a workflow comprises adding one or more inserters to the workflow in response to determining that the mean value of the ratios is less than the second threshold value.

* * * * *